United States Patent
Hong et al.

(10) Patent No.: US 8,980,452 B2
(45) Date of Patent: Mar. 17, 2015

(54) BATTERY CASE AND BATTERY PACK USING THE SAME

(75) Inventors: Won-Ki Hong, Yongin-si (KR); Seung-Il Kim, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 182 days.

(21) Appl. No.: 13/285,266

(22) Filed: Oct. 31, 2011

(65) Prior Publication Data

US 2012/0141839 A1    Jun. 7, 2012

(30) Foreign Application Priority Data

Dec. 1, 2010   (KR) .......................... 10-2010-0121468

(51) Int. Cl.
| | | |
|---|---|---|
| H01M 2/02 | (2006.01) | |
| H01M 10/48 | (2006.01) | |
| H01M 2/10 | (2006.01) | |
| H01M 2/14 | (2006.01) | |
| H01M 2/34 | (2006.01) | |

(52) U.S. Cl.
CPC ............ H01M 10/486 (2013.01); H01M 2/105 (2013.01); H01M 2/1072 (2013.01); H01M 2/14 (2013.01); H01M 2/348 (2013.01); H01M 10/482 (2013.01)
USPC .......................................................... 429/7

(58) Field of Classification Search
None
See application file for complete search history.

(56) References Cited

U.S. PATENT DOCUMENTS

| 3,928,907 | A | | 12/1975 | Chisholm |
|---|---|---|---|---|
| 5,623,191 | A | | 4/1997 | Wieloch |
| 6,152,597 | A | * | 11/2000 | Potega .......................... 374/185 |
| 2003/0223474 | A1 | * | 12/2003 | Roepke ......................... 374/152 |
| 2006/0028183 | A1 | * | 2/2006 | Izawa et al. .................... 320/150 |
| 2006/0103346 | A1 | | 5/2006 | Misu et al. |
| 2007/0229026 | A1 | * | 10/2007 | Morioka et al. ............... 320/112 |
| 2008/0280192 | A1 | | 11/2008 | Drozdz et al. |
| 2009/0022206 | A1 | * | 1/2009 | Shibuya et al. ............... 374/208 |
| 2009/0098452 | A1 | | 4/2009 | Takahashi et al. |
| 2009/0117452 | A1 | * | 5/2009 | Wiesner et al. ................. 429/90 |
| 2009/0120620 | A1 | | 5/2009 | Abe et al. |
| 2009/0280401 | A1 | | 11/2009 | Kim |

(Continued)

FOREIGN PATENT DOCUMENTS

| JP | 10-243565 | 9/1998 |
|---|---|---|
| JP | 11-345631 | 12/1999 |

(Continued)

OTHER PUBLICATIONS

Korean Notice of Allowance issued on Dec. 30, 2012 by KIPO in connected with Korean Patent Application No. 10-2010-0121468 and Request for Entry of the Accompanying Office Action attached herewith.

(Continued)

*Primary Examiner* — Patrick Ryan
*Assistant Examiner* — Wyatt McConnell
(74) *Attorney, Agent, or Firm* — Robert E. Bushnell, Esq.

(57) ABSTRACT

A battery unit and a battery module having stack battery units. The battery unit includes a battery cell including electrode terminals and a case for housing the battery cell. The case further includes: a spacer that is disposed on facing portions of an edge of the case and protrudes in a thickness direction of the case, an inlet guide portion for guiding air for cooling the battery cell, and an outlet guide portion for guiding air to be discharged toward the electrode terminals.

14 Claims, 4 Drawing Sheets

(56) References Cited

U.S. PATENT DOCUMENTS

| | | |
|---|---|---|
| 2010/0117581 A1* | 5/2010 | Miwa et al. .................. 318/472 |
| 2010/0297482 A1 | 11/2010 | Yoon et al. |
| 2012/0028084 A1 | 2/2012 | Park et al. |

FOREIGN PATENT DOCUMENTS

| | | |
|---|---|---|
| JP | 2006-35942 A | 2/2006 |
| JP | 2006-140054 A | 6/2006 |
| JP | 2009-119937 | 6/2009 |
| JP | 2009-250768 A | 10/2009 |
| JP | 2010-190788 A | 9/2010 |
| KR | 10-2007-0099566 | 10/2007 |
| KR | 2010-0081451 A | 7/2010 |

OTHER PUBLICATIONS

Korean Office Action issued on Jun. 13, 2012 by the Korean Intellectual Property Office in the corresponding Korean Patent Application No. 2010-0121468.

* cited by examiner

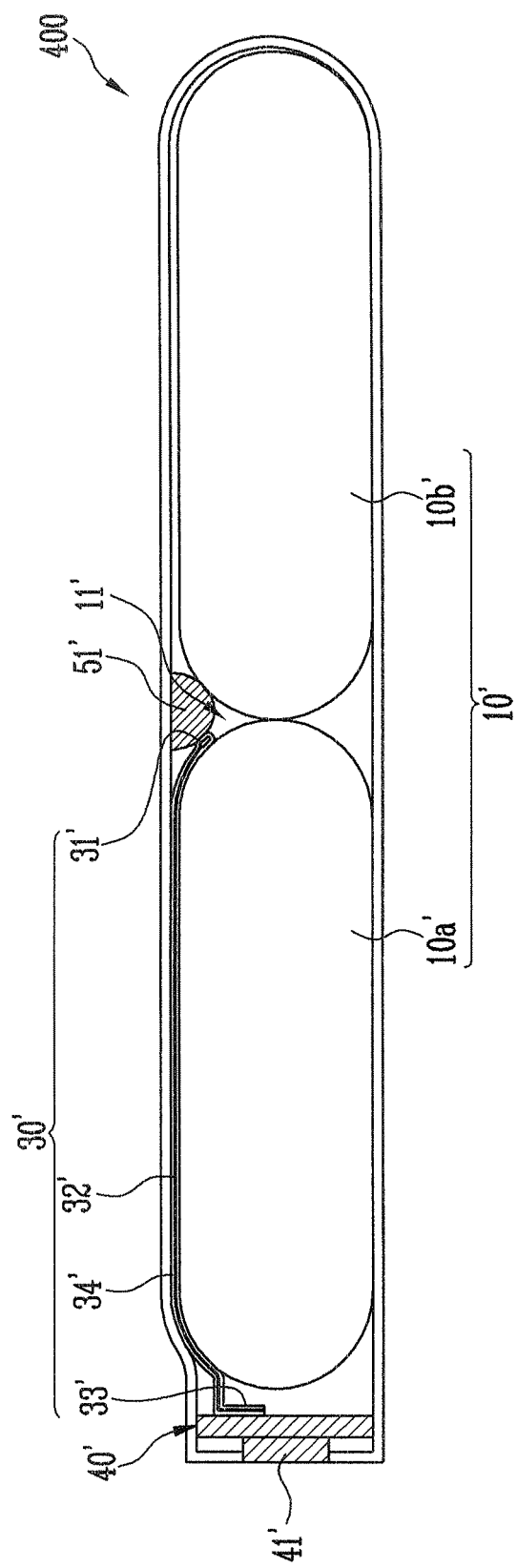

BATTERY CASE AND BATTERY PACK USING THE SAME

CLAIM OF PRIORITY

This application claims priority to and the benefit of Korean Patent Application No. 10-2010-0121468, filed on Dec. 1, 2010, in the Korean Intellectual Property Office, the entire content of which is incorporated herein by reference.

BACKGROUND OF THE INVENTION

1. Field of the Invention

An aspect of the present invention relates to a battery case and a battery pack.

2. Description of the Related Art

With the rapid development of electronic and communication industries, mobile electronic devices have recently come into wide use. Secondary batteries are widely used as power sources for the mobile electronic devices due to their economical efficiencies. The secondary batteries may also be used not only in cellular phones or notebook computers but also in medium and large-sized apparatuses such as machine tools, electric bicycles and automobiles, which requires high output and high power. The secondary batteries used in the medium and large-sized apparatuses are used as a battery pack obtained as a power source by connecting a plurality of bare cells in series and/or parallel.

As described above, the battery pack having the plurality of bare cells further includes various protection devices for the purpose of safety. Among these protection devices, a temperature measurement device measures a temperature of the battery pack and then transfers the temperature to a protection circuit module. If a predetermined temperature is sensed, the temperature measurement device transfers the sensed temperature to the protection circuit module so that current is cut off. Accordingly, the battery pack does not generate excessive heat which could cause a fire.

The above information disclosed in this Related Art section is only for enhancement of understanding of the background of the invention and therefore it may contain information that does not form the prior art that is already known to a person of ordinary skill in the art.

SUMMARY OF THE INVENTION

Exemplary embodiments provide for a battery case and a battery pack using the same for enabling a temperature measurement device to be easily adhered closely to a bare cell by a compression member attached between the case and the temperature measurement device.

According to an aspect of the present invention, there is provided a battery pack that may include: a plurality of bare cells connected in series or parallel; a protection circuit module positioned at an outside of the bare cells and electrically connected to the bare cells; a temperature measurement device having one side connected to the protection circuit module and the other side positioned at an outer circumferential surface of the bare cell; and a case to house the bare cells, the protection circuit module and the temperature measurement device, wherein a compression member to compress the temperature measurement device is further formed between the case and the temperature measurement device.

The compression member may be integrally formed with the case.

The compression member may include an elastic body.

The elastic body may include sponge or rubber.

The temperature measurement device may include a temperature sensing portion to sense a temperature of the bare cells, a contact portion connected to the protection circuit module, and a connection portion to connect the temperature sensing portion and the connection portion.

The temperature sensing portion may be positioned at a bent portion of the bare cell.

The bent portion may be a space formed between outer circumferential surfaces of one bare cell and another bare cell, which are disposed adjacent to each other in parallel.

The compression member may be formed at a position corresponding to the temperature sensing portion.

A fixing member may be further formed on an upper surface of the connection portion, and both ends of the fixing member may be fixed to the outer circumferential surface of the bare cell.

The fixing member may include an adhesive tape.

An adhesive means may be formed between the bare cell and the temperature sensing portion.

The adhesive means may include an adhesive.

A heat transfer means may be formed between the bare cell and the temperature sensing portion.

The heat transfer means may include thermal silicon.

The temperature measurement device may further include an insulating member to surround the temperature sensing portion and the connection portion.

The temperature measurement device may be formed in a film type.

The contact portion of the temperature measurement device may be connected to the protection circuit module through soldering.

As described above, according to embodiments of the present invention, since a temperature measurement device is easily adhered closely to a bare cell by a compression member attached between a case and the temperature measurement device, the manufacturing process of a battery pack is simplified, so that it is possible to improve manufacturing efficiency and to reduce manufacturing cost.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 7 is a sectional view of a battery pack taken along line II-II' of FIG. 6.

DETAILED DESCRIPTION OF THE INVENTION

Figure 1:
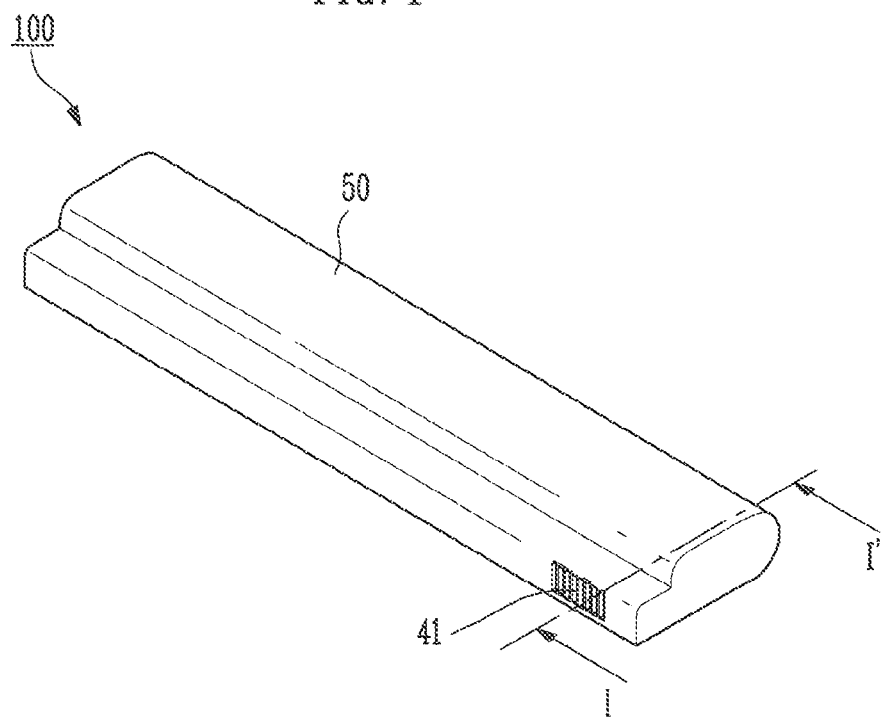
FIG. 1 is a perspective view of a battery pack according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the other element or be indirectly connected to the another element with one or more intervening elements interposed therebetween. Hereinafter, like reference numerals refer to like elements. In the drawings, the thickness or size of layers are exaggerated for clarity and not necessarily drawn to scale.

In order to clarify the present invention, elements extrinsic to the description are omitted from the details of this description, and like reference numerals refer to like elements throughout the specification.

In several exemplary embodiments, constituent elements having the same configuration are representatively described in a first exemplary embodiment by using the same reference numeral and only constituent elements other than the constituent elements described in the first exemplary embodiment will be described in other embodiments.

In general, a temperature measurement device for measuring a temperature of a battery pack has one side fixed to a protection circuit module through soldering and the other side positioned at a side of a bare cell so as to sense the temperature of the battery pack. In this instance, the other side to sense the temperature of the battery pack is fixed to an outer circumferential surface of the bare cell. However, the method of fixing the other side of the temperature measurement device to the bare cell using a separate adhesive means is complicated, and it is difficult to adhere the other side of the temperature measurement device closely to the bare cell.

Therefore, in the battery pack, a mechanism is required to solve problems in which manufacturing efficiency is lowered and that the temperature measurement device is not adhered closely to the bare cell. Hereinafter, embodiments of the present invention as the plan for solving such problems will be described in detail with reference to the accompanying drawings.

Figure 2:
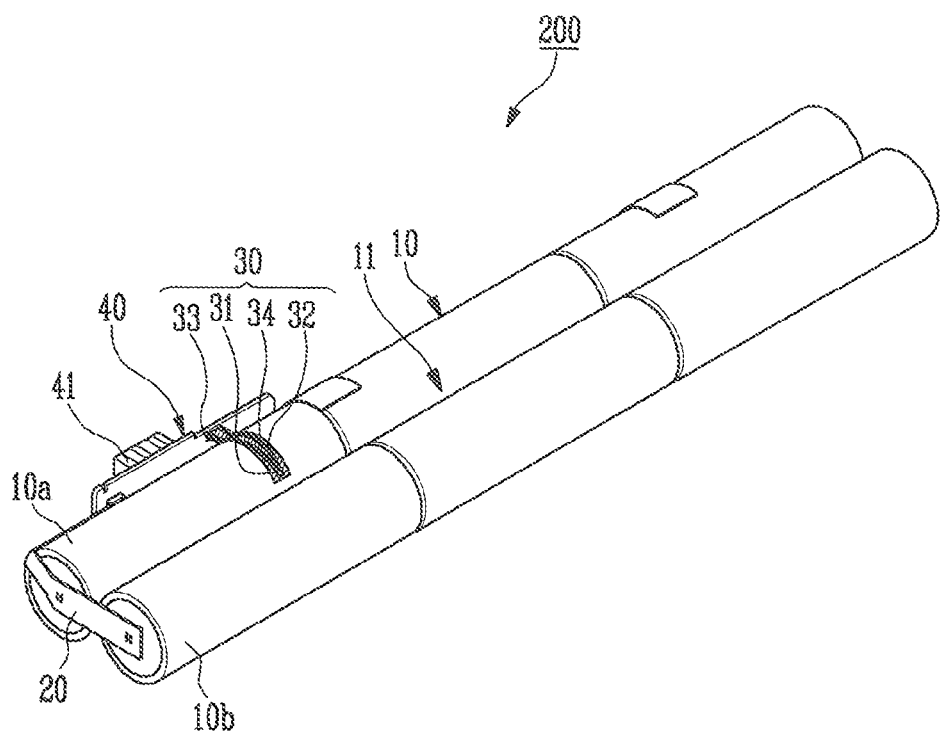
FIG. 2 is a perspective view of a core pack positioned in the interior of the battery pack shown in FIG. 1.

FIG. 1 is a perspective view of a battery pack according to an embodiment of the present invention. FIG. 2 is a perspective view of a core pack positioned in the interior of the battery pack shown in FIG. 1.

Referring to FIGS. 1 and 2, the battery pack 100 according to this embodiment includes a plurality of cylindrical bare cells 10, a protection circuit module 40 positioned at an outside of the bare cells 10, a temperature measurement device 30 and a case 50 to house them. The plurality of bare cells 10 are connected in series or parallel so as to be electrically connected to the protection circuit module 40.

The temperature measurement device 30 measures a temperature of the bare cells 10 and transfers the temperature to the protection circuit module 40. One side of the temperature measurement device 30 is fixed to the protection circuit module 40, and the other side of the temperature measurement device 30 is positioned on an outer circumferential surface of the bare cell 10. In this instance, the one side of the temperature measurement device 30 may be connected to the protection circuit module 40 through soldering.

The bare cell 10 includes an electrode assembly (not shown) formed by winding a positive electrode plate, a negative electrode plate and a separator interposed therebetween, and a case in which an electrolyte is accommodated. The bare cell 10 supplies electric energy generated by a chemical reaction of the electrode assembly and the electrolyte to the exterior thereof. For example, the bare cell 10 may be a lithium secondary battery.

The protection circuit module 40 may include a printed circuit board, a protection circuit device, and the like. One or more devices to connect the bare cells 10 to an external electronic device are mounted on the printed circuit board. The protection circuit module 40 is electrically connected to the bare cells 10 by a terminal tab 20, and the terminal tab 20 may be formed of nickel, copper or the like.

The protection circuit module 40 may further include a connector 41 formed at one side thereof. The connector 41 is a portion fastened to the external electronic device, and the battery pack can be electrically connected to the external electronic device by the connector 41.

Generally, the temperature measurement device 30 is a semiconductor formed by mixing two or three kinds of oxides and sintering the mixture so as to have a proper specific resistance and a proper temperature coefficient. Here, the two or three oxides include cobalt, copper, manganese, iron, nickel, titanium and the like.

The temperature measurement device 30 may be divided into a negative temperature coefficient (NTC) and a positive temperature coefficient (PTC). The NTC has a characteristic in which resistance decreases as temperature increases, and the PTC has a characteristic in which resistance increases as temperature decreases. Since a rapid change in resistance is generated by even a minute change in temperature due to a small heat capacity of the temperature measurement device 30, the temperature measurement device 30 is frequently used as a sensor for temperature control.

In this embodiment, the temperature measurement device 30 senses a temperature of the plurality of bare cells 10 and transfers the temperature to the protection circuit module 40. The temperature measurement device 30 includes a temperature sensing portion 31 to sense the temperature of the bare cells 10, a contact portion 33 connected to the protection circuit module 40, and a connecting portion 32 to connect the temperature sensing portion 31 to the contact portion 33.

In the temperature measurement device 30, the temperature sensing portion 31 may be positioned at a bent portion 11 between bare cells 10a and 10b. Here, the bent portion 11 may be a space formed between outer circumferential surfaces of the bare cells 10a and 10b disposed adjacent to each other in parallel. That is, the temperature sensing portion 31 may be positioned at a concave portion formed between the outer circumferential surfaces of the one bare cell 10a and the other bare cell 10b.

In the temperature measurement device 30, the contact portion 33 is soldered to the protection circuit module 40, and the temperature sensing portion 31 and the connection portion 32 are positioned at the bent portion 11 to be vertical to the length direction of the bare cell 10. Since the outer circumferential surface of the bare cell 10 is formed in a round shape, the temperature measurement device 30 may be lifted off from the outer circumferential surface of the bare cell 10. Therefore, a compression member 51 (see FIG. 3) may be further provided so as to easily fix the temperature measurement device 30 to the bare cell 10.

The compression member 51 is positioned between the temperature measurement device 30 and the case 50 to house the core pack 200 so as to compress the temperature measurement device 30. The compression member 51 will be described in detail later with reference to the following drawings.

In the temperature measurement device 30, the temperature sensing portion 31 to sense the temperature of the bare cell 10 may be connected to the contact portion 33 soldered to the protection circuit module 40 the temperature sensing portion 31 to sense the temperature of the bare cell 10 may be connected to the contact portion 33 soldered to the protection circuit module 40 by the connection portion 32. The temperature measurement device 30 may be formed in a film type, and may further include an insulating member 34 formed in a flat shape to surround outer surfaces of the temperature sensing portion 31 and the connection portion 32. Accordingly, the temperature measurement device 30 is adhered closely to the bare cell 10, and therefore, its twist is prevented. Thus, it is possible to improve the manufacturing management and workability of the core pack 200.

Figure 3:
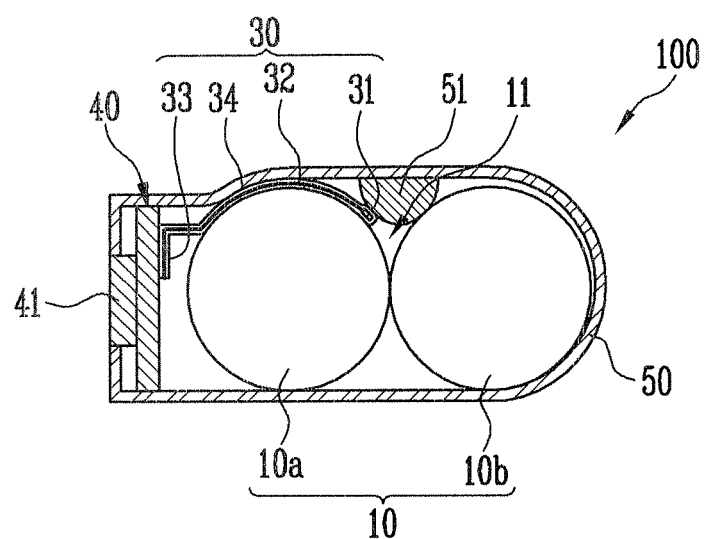
FIG. 3 is a cross-sectional view taken along line I-I' of FIG. 1.

FIG. 3 is a cross-sectional view taken along line I-I' of FIG. 1. In FIG. 3, descriptions of components identical to those in FIGS. 1 and 2 will be omitted.

Referring to FIG. 3, the battery pack 100 according to this embodiment includes a plurality of bare cells 10, and a protection circuit module 40 positioned at an outside of the bare cells 10 and electrically connected to the bare cells 10. The battery pack 100 is also provided with a temperature measurement device 30 having one side connected to the protection circuit module 40 and the other side positioned at an outer circumferential surface of the bar cell 10. The battery pack 100 further includes a case 50 to house the plurality of bare cells 10, the protection circuit module 40 and the temperature measurement device 30.

As described above, the temperature measurement device 30 may include a temperature sensing portion 31 to sense the temperature of the bare cells 10, a contact portion 33 fixed to the protection circuit module 40 through soldering, and a connecting portion 32 to connect the temperature sensing portion 31 to the contact portion 33. In the temperature measurement device 30, the contact portion 33 is fixed to the protection circuit module 40, and the temperature sensing portion 31 is positioned at an outer circumferential surface of the bare cell 10. The connection portion 32 is positioned along an outer circumferential surface of a bare cell 10a to be vertical to the length direction of the bare cell 10.

The temperature sensing portion 31 may be positioned at a bent portion 11 between two bare cells 10a and 10b connected in parallel among the plurality of bare cells 10. More specifically, the bent portion 11 refers to a space formed between the one bare cell 10a and the other bare cell 10b disposed adjacent to each other in parallel. The case 50 to house the core pack may further include a compression member 51 formed in a space between outer circumferential surfaces of the bare cells 10a and 10b. That is, the compression member 51 is formed between the case 50 and the temperature measurement device 30 so as to compresses the temperature measurement device 30. Accordingly, the temperature measurement device 30 can be adhered closely to the outer circumferential surface of the bare cell 10a.

Here, the compression member 51 may be integrally formed with the case 50, or may be separately manufactured so as to be formed at a position corresponding to the temperature sensing portion 31. The compression member 51 may be formed of an elastic body, and the elastic body may include, for example, sponge or rubber.

As described above, the compression member 51 compresses the temperature measurement device 30, particularly the temperature sensing portion 31, so that it is possible to prevent the temperature measurement device 30 from being lifted off from the outer circumferential surface of the bare cell 10a. Thus, the temperature measurement device 30 can be easily, adhered closely to the bare cell 10a. Accordingly, since the temperature measurement device 30 is fixed to the bare cell 10a by using the compression member 51, the manufacturing process of the battery pack 100 is simplified, so that it is possible to improve manufacturing efficiency and to reduce manufacturing cost.

Figure 4:
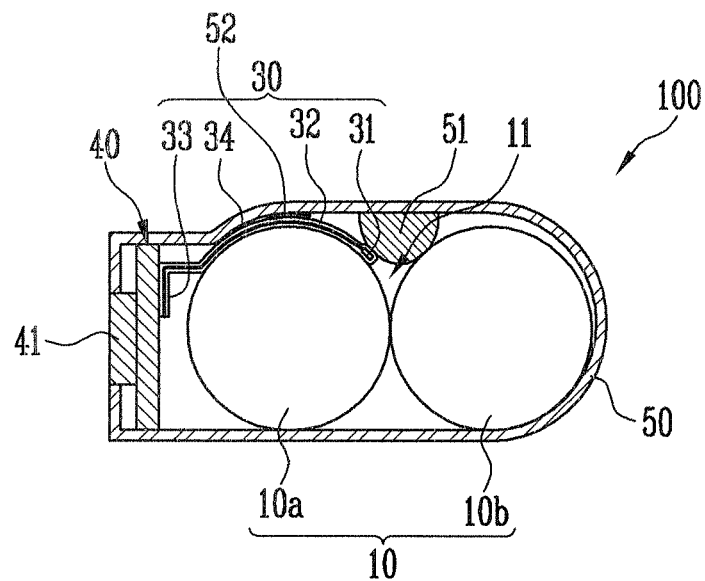
FIG. 4 is a cross-sectional view showing a state that an insulating tape is further included in the battery pack of FIG. 3.

FIG. 4 is a cross-sectional view showing a state that an insulating tape is further included in the battery pack of FIG. 3.

Referring to FIG. 4, a fixing member 52 such as an adhesive tape may be further formed on an upper surface of the connection portion 32 of the temperature measurement device 30. That is, both ends of the fixing member 52, are fixed to the outer circumferential surface of the bare cell 10a, so that the connection portion 32 can be attached to the bare cell 10a. Accordingly, in addition to the temperature sensing portion 31, the connection portion 32 can be adhered closely to the outer circumferential surface of the bare cell 10a. As described above, the fixing member 52 is formed on the connection portion 32, so that the temperature measurement device 30 can be more firmly and stably fixed to the bare cell 10a.

Figure 5:
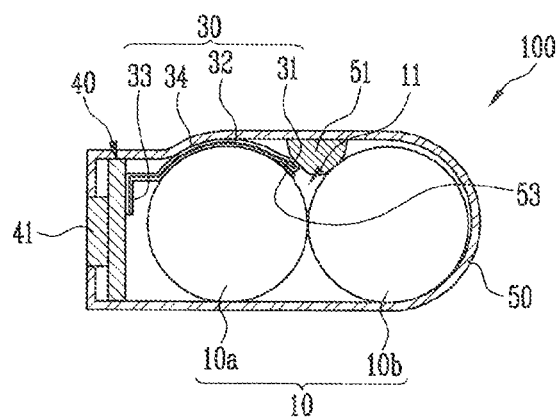
FIG. 5 is a cross-sectional view showing a state that thermal silicon is further included in the battery pack of FIG. 3.

FIG. 5 is a cross-sectional view showing a state that thermal silicon is further included in the battery pack of FIG. 3.

Referring to FIG. 5, the temperature sensing portion 31 is positioned at the bent portion 11 of the bare cell 10a, and is compressed and fixed by the compression member 51. In this instance, an adhesive means such as an adhesive may be formed between the temperature sensing portion 31 and the bare cell 10a. Thus, the temperature sensing portion 31 can be more firmly fixed to the bare cell 10a by the adhesive means 53.

A heat transfer means such as thermal silicon may be formed between the temperature sensing portion 31 and the bare cell 10a. Accordingly, heat generated from the bare cell 10a can be more precisely transferred to the temperature sensing portion 31. At the same time, the temperature sensing portion 31 can be fixed to the bent portion 11 of the bare cell 10a by the heat transfer means.

Figure 6:
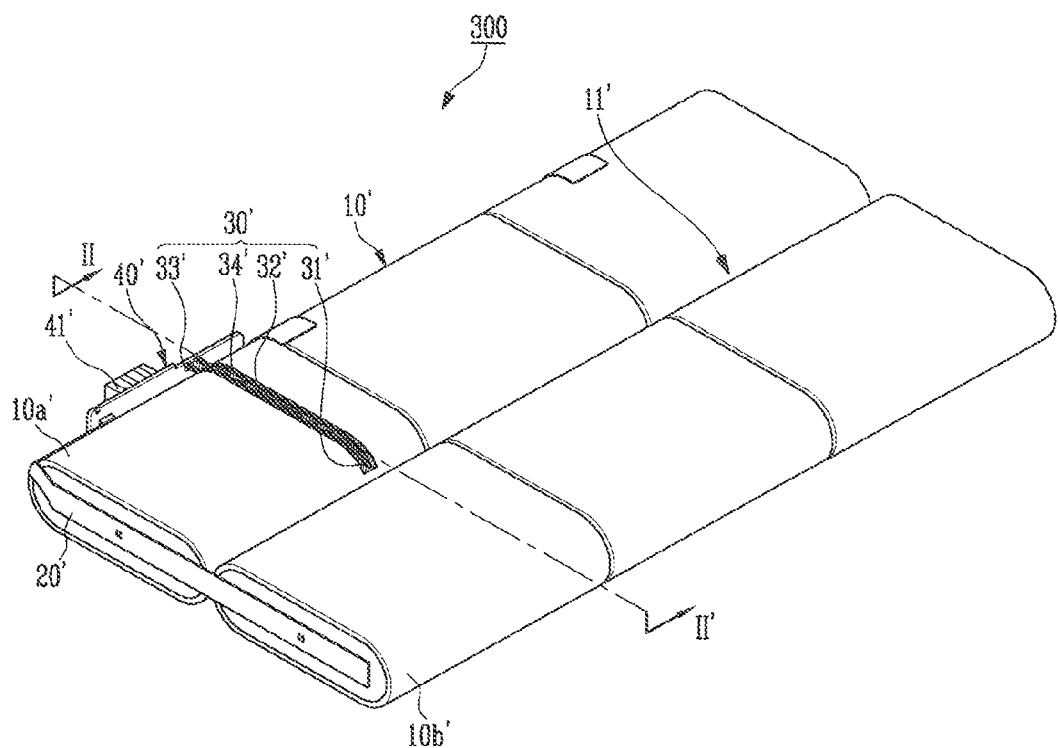
FIG. 6 is a perspective view of a core pack according to another embodiment of the present invention.

FIG. 6 is a perspective view of a core pack according to another embodiment of the present invention. FIG. 7 is a sectional view of a battery pack taken along line II-II' of FIG. 6.

Referring to FIGS. 6 and 7, the core pack 300 according to this embodiment includes a plurality of prismatic bare cells 10', a protection circuit module 40' and a temperature measurement device 30'. The battery pack 100' further includes a case 50' to house the prismatic bare cells 10', the protection circuit module 40' and the temperature measurement device 30'. Here, the section of the prismatic bare cell 10' in the length direction may be formed in an elliptical shape.

One side of the temperature measurement device 30' is connected to the protection circuit module 40', and the other side of the temperature measurement device 30' is positioned at an outer circumferential surface of the bare cell 10'. That is, a contact portion 33' of the temperature measurement device 30' is vertically connected to the protection circuit module 40'. The temperature measurement device 30' connected as described above is positioned at the outer circumferential surface of the bare cell 10' so as to be vertical to the length direction of the bare cell without bending. Accordingly, a connection portion 32' to connect the contact portion 33' to a temperature sensing portion 31' may be positioned while coming in contact with the outer circumferential surface of the bare cell 10'.

A compression member 51' to compress the temperature measurement device 30' is further formed between the case 50' and the temperature measurement device 30'. The compression member 51' may be formed at a position corresponding to the temperature sensing portion 31' in the temperature measurement device 30'. Here, the temperature sensing portion 31' may be positioned at a bent portion 11' that is a space formed between outer circumferential surfaces of bare cells 10a' and 10b' disposed adjacent to each other in parallel. Alternatively, the temperature sensing portion 31' may be positioned at the outer circumferential surface of the bare cell 10a'.

The compression member 51' may be integrally formed with the inner surface of the case 50', or may be separately manufactured so as to be formed between the case 50' and the temperature measurement device 30'. In a case where the compression member 51' is integrally formed with the case 50', the bare cells 10' may be housed by the case 50', and the temperature measurement device 30' may be simply fixed to an outer surface of the bare cell 10a' by the compression member 51'.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery pack, comprising:
   a plurality of bare cells connected in series or parallel;
   a protection circuit module positioned on an exterior surface of the bare cells and electrically connected to the bare cells;
   a temperature measurement device having a contact portion at one end of the temperature measurement device directly connected to the protection circuit module and a temperature sensing portion at another end of the temperature measurement device, said temperature sensing portion of said temperature measurement device senses a temperature of solely a single bare cell of the plurality of bare cells and is in direct contact with an outer circumferential surface of said single bare cell, said temperature sensing portion is formed in a film having a flat rectangular shape and follows the contours of the outer circumferential surface of the single bare cell for an entire length of said temperature sensing portion;
   a case to entirely and completely enclose the plurality of bare cells, the protection circuit module and the temperature measurement device having an inner surface and an outer surface; and
   a compression member in direct contact with the inner surface of the case, the temperature sensing portion of the temperature measurement device and an outer surface of solely one bare cell of the plurality of bare cells that is adjacent to said single bare cell to which the temperature sensing portion is in direct contact to compress the temperature measurement device against said single bare cell to which the temperature sensing portion is in direct contact.

2. The battery pack according to claim 1, wherein the compression member is integrally formed with the case.

3. The battery pack according to claim 1, wherein the compression member includes an elastic body.

4. The battery pack according to claim 3, wherein the elastic body includes a sponge or rubber material.

5. The battery pack according to claim 1, wherein the temperature sensing portion includes a connection portion to connect the temperature sensing portion and the contact portion, said connection portion is in direct contact with the single bare cell and follows the contours of the outer circumferential surface of the single bare cell.

6. The battery pack according to claim 5, wherein the temperature sensing portion is positioned at a bent portion of the bare cell.

7. The battery pack according to claim 6, wherein the bent portion of the bare cell is located next to a space formed between outer circumferential surfaces of one bare cell and another bare cell, which are disposed adjacent to each other in parallel.

8. The battery pack according to claim 5, wherein the compression member is formed at a position corresponding to the temperature sensing portion.

9. The battery pack according to claim 5, wherein a fixing member is further formed on an upper surface of the connection portion, and both ends of the fixing member are fixed to the outer circumferential surface of the bare cell.

10. The battery pack according to claim 9, wherein the fixing member includes an adhesive tape.

11. The battery pack according to claim 1, wherein the contact portion of the temperature measurement device is connected to the protection circuit module through soldering.

12. The battery pack according to claim 1, wherein the plurality of bare cells have a cylindrical shape and the temperature measurement device conforms to the cylindrical shape.

13. The battery pack according to claim 1, wherein the plurality of bare cells have a prismatic shape and the temperature measurement device conforms to the prismatic shape.

14. The battery pack according to claim 1, wherein the compression member exerts pressure onto the temperature measurement device to hold the temperature measurement device against the outer circumferential surface of the bare cell.

* * * * *